(12) United States Patent
Nakatomi et al.

(10) Patent No.: US 11,446,778 B2
(45) Date of Patent: Sep. 20, 2022

(54) STAGE MECHANISM

(71) Applicant: BIBLIOS Co., LTD., Chiyoda-ku Tokyo (JP)

(72) Inventors: Yoshiharu Nakatomi, Chiyoda-ku Tokyo (JP); Takeshi Onodera, Chiyoda-ku Tokyo (JP); Shinji Suzuki, Chiyoda-ku Tokyo (JP)

(73) Assignee: BIBLIOS Co., LTD., Tokyo (JP)

( * ) Notice: Subject to any disclaimer, the term of this patent is extended or adjusted under 35 U.S.C. 154(b) by 351 days.

(21) Appl. No.: 16/495,835

(22) PCT Filed: Jun. 25, 2019

(86) PCT No.: PCT/JP2019/025069
§ 371 (c)(1),
(2) Date: Mar. 16, 2020

(87) PCT Pub. No.: WO2020/121562
PCT Pub. Date: Jun. 18, 2020

(65) Prior Publication Data
US 2020/0238458 A1    Jul. 30, 2020

(30) Foreign Application Priority Data

Dec. 13, 2018  (JP) .............................. JP2018-233408

(51) Int. Cl.
*B23Q 1/44* (2006.01)
*B23Q 5/56* (2006.01)
*B23Q 1/28* (2006.01)

(52) U.S. Cl.
CPC .............. *B23Q 1/44* (2013.01); *B23Q 1/282* (2013.01); *B23Q 5/56* (2013.01)

(58) Field of Classification Search
CPC ........ B23Q 1/44; B23Q 1/26728; B23Q 1/58; B23Q 1/282; B23Q 5/56; F16H 25/20;
(Continued)

(56) References Cited

U.S. PATENT DOCUMENTS 2,371,045 A * 3/1945 Granberg ................. B23Q 5/56
82/132
2,498,870 A * 2/1950 Armitage ................. B23Q 5/56
74/441

FOREIGN PATENT DOCUMENTS

CN       107088781 A     8/2017
JP       H01-288660 A   11/1989
(Continued)

OTHER PUBLICATIONS

WO-2011152109-A1 English Translation (Year: 2011).*
Extended European Search Report dated Apr. 8, 2020.

*Primary Examiner* — Tyrone V Hall, Jr.
*Assistant Examiner* — Makena S Markman
(74) *Attorney, Agent, or Firm* — Yokoi & Co., U.S.A.; Toshiyuki Yokoi

(57) ABSTRACT

A stage mechanism includes a feed screw, a fixed stage having a space portion incorporating the feed screw, a movable stage, and a backlash absorbing portion. The feed screw has a first end portion and a second end portion. The stage mechanism further includes a deviation preventing portion preventing the feed screw from deviating in a direction toward the first end portion and a pressing force adjusting portion adjusting the pressing force by which the feed screw is pressed in a direction from the second end portion side to the first end portion. The deviation preventing portion is in contact with a wall of the space portion on the first end portion side. The pressing force adjusting portion is in line contact with and presses the second end portion.

10 Claims, 11 Drawing Sheets

(58) Field of Classification Search
CPC ..... F16H 25/2003; B65G 21/14; B65G 21/20; G12B 5/00
See application file for complete search history.

(56) References Cited

FOREIGN PATENT DOCUMENTS

| | | | |
|---|---|---|---|
| JP | 2003-48129 A | 2/2003 | |
| JP | 2010-223611 A | 10/2010 | |
| WO | 2011/152109 A | 12/2011 | |
| WO | WO-2011152109 A1 * | 12/2011 | ............... B23Q 1/26 |

* cited by examiner

STAGE MECHANISM

TECHNICAL FIELD

The present invention relates to a stage mechanism (hereinafter sometimes simply called as "fixed stage" or "fix stage") including a feed screw and, more particularly, to a compact stage mechanism entailing little backlash and little play in a direction along the axis of a feed screw.

BACKGROUND ART

Stage mechanisms are widely used in various industries for workpieces to be positioned and moved with precision.

For example, Patent Document 1 discloses one of such stage mechanisms. As illustrated in FIG. 9, a sliding part 204 to which precision equipment is attached by a fastener and a fixed part 205 connected to a base by a fastener are connected via a sliding mechanism in this stage mechanism, which is a manual stage 200. Position adjustment is performed on the attached precision equipment by the sliding part 204 being slid by a handle 219 being operated.

The fixed part 205 is made of a resin. In the wall portions on both sides of the fixed part 205, longitudinal grooves 232 are respectively provided such that inverted triangular protruding portions 231 are formed.

In the manual stage 200, a slide fixing screw 210 is allowed to abut against the protruding portion 231 through a slide fixing screw hole 216 provided in the wall portion, the sliding part 204 is pressed by the protruding portion 231 being inclined inward, and then the position of the sliding part 204 relative to the fixed part 205 can be fixed.

Further, a plurality of slide adjustment screws (not illustrated) are allowed to abut against the protruding portion 231 through a plurality of slide adjustment screw holes 215 provided in the wall portions on both sides of the fixed part 205, the sliding part 204 is pressed by the protruding portion 231 being inclined inward, and then the fixed part 205 and the sliding part 204 can be finely adjusted in terms of the degree of sliding.

Patent Document 2, for example, discloses a stage fixing device as an another stage mechanism.

As illustrated in FIG. 10, this stage fixing device is a stage fixing device 300 provided with a base table 301, a fixed stage 302, a stage 303 for fixing a workpiece, and machining shafts 304 and 306. The stage 303 can be fixed at a predetermined position by the position of the stage 303 being adjusted by the machining shafts 304 and 306.

With the stage fixing device 300, it is possible to fix a high-precision stage with firmness and precision.

The applicant has proposed a stage mechanism in, for example, Patent Document 3. With the stage mechanism, which is a compact and inexpensive simple structure, a movable stage is slid with ease and stability, little backlash arises when the movable stage is fixed, and little movement arises after the movable stage is fixed.

This stage mechanism is a stage mechanism 400 as shown in FIG. 11(a) and so on. FIG. 11(a) is a perspective view of the stage mechanism 400. FIG. 11(b) is a cross-sectional view of the stage mechanism 400 (cross-sectional view obtained in the case of cutting along the A-A line in FIG. 11(a)). As illustrated in FIGS. 11(a) and 11(b), the stage mechanism 400 includes a fixed stage 401 and a movable stage 403 sliding along the surface of the fixed stage 401.

Specifically, a feed screw 405 and a backlash absorbing portion 407 are provided in the fixed stage 401 as illustrated in FIG. 11(b). The stage mechanism 400 is provided with a connecting member 409 for sliding the movable stage 403 in synchronization with feeding of the feed screw 405.

Incidentally, in FIG. 11, 409a denotes a connecting member fixing tool and 405a denotes a feed screw locking member.

PRIOR ARTS

Patent Document

Patent Document 1: JP 2010-223611 A (claims)
Patent Document 2: JP 2003-48129 A (claims, etc.)
Patent Document 3: JP 4838402 B1 (claims, etc.)

DISCLOSURE OF THE INVENTION

Problems to be Solved by the Invention

However, the manual stage disclosed in Patent Document 1 requires a dovetail groove slide rail, the slide fixing screw, the plurality of slide adjustment screws, and so on. As a result, problems arise in that the number of parts and structural complexity increase, a large backlash occurs when the manual stage is fixed, and the fixability of the manual stage is insufficient.

In the stage fixing device disclosed in Patent Document 2, the two machining shafts need to be provided so as to protrude to the outside of the stage (that is, from the outer periphery of the stage), which leads to a problematic increase in the size of the stage as a whole. Further problems arise in that a large backlash occurs when the stage is fixed and the fixability of the stage is insufficient.

Although the stage mechanism disclosed in Patent Document 3 is very satisfactory in terms of backlash reduction, the connecting portion that includes the feed screw protrudes to the side of the fixed stage and there is a demand for further reduction in size. Further, the feed screw operability improvement is also desired in that the feed screw is slightly heavy in terms of operability.

This application has been made in view of the points described above, and an object of the invention is to provide a novel stage mechanism that includes a feed screw, entails little backlash, entails little play in a direction along the axis of the feed screw, and is easily reduced in size.

Means for Solving Problem

In order to achieve this object, the inventor of the present application has conducted intensive research on utilizing the function of a backlash absorbing portion created by the inventor, a structure for mounting a feed screw on a fixed stage, and a structure in the vicinity of both axial end portions of the feed screw.

As a result, the inventor has found that the above object can be achieved by means of the following configuration.

According to the invention, the problems described above can be solved by means of a stage mechanism including a feed screw, a fixed stage having a space portion incorporating the feed screw, a movable stage performing a predetermined movement in response to a rotational motion of the feed screw, a backlash absorbing portion preventing backlash of the feed screw, a deviation preventing portion provided near a first end portion as one end of the feed screw, in contact with a wall of the space portion, and preventing the feed screw from deviating in a direction toward the first end portion, and a pressing force adjusting portion having an end in contact with a second end portion as the other end of the feed screw and adjusting a pressing force by which the feed screw is pressed in a direction from the second end portion side to the first end portion, the other end of the pressing force adjusting portion being fixed to the wall of the space portion.

In other words, the stage mechanism is provided with the backlash absorbing portion, the predetermined feed screw deviation preventing portion, and the predetermined feed screw pressing force adjusting portion, and thus it is possible to provide a novel stage mechanism that entails little backlash, entails little play in a direction along the axis of the feed screw, and is easily reduced in size.

In configuring the stage mechanism of the invention, it is preferable that the pressing force adjusting portion includes a structural member in line contact or point contact with the second end portion of the feed screw.

With such a configuration, it is possible to reduce the frictional force that is generated between the second end portion and the pressing force adjusting portion when the feed screw is rotated and the stage can be moved smoothly.

In configuring the stage mechanism of the invention, it is preferable that the pressing force adjusting portion includes a columnar member, one of a surface of the pressing force adjusting portion with respect to the second end portion and a surface of the second end portion with respect to the pressing force adjusting portion has a spherical surface shape, and the other has a recess shape having a surface in contact with a surface tangent to the spherical surface shape.

With such a configuration, it is possible to reduce the play in a direction along the axis of the feed screw and reduce the play in a direction perpendicular to the axis of the feed screw.

In configuring the stage mechanism of the invention, it is preferable that the pressing force adjusting portion includes a spherical member and a spherical surface pressing member having a recess at a tip, the recess has a shape in contact with a surface tangent to the spherical member, the second end portion includes a spherical surface pressure receiving portion having a recess at a tip, the recess has a surface in contact with a surface tangent to the spherical member, and the spherical member is sandwiched by the spherical surface pressure receiving portion and the spherical surface pressing member on an axis of the feed screw.

With such a configuration, it is possible to reduce the play in a direction perpendicular to the axis of the feed screw, a standard product can be used as a member having a spherical surface structure, and mass production is facilitated.

In configuring the stage mechanism of the invention, it is preferable that the pressing force adjusting portion includes a screw member applying pressing to the second end portion of the feed screw.

With such a configuration, a pressing force can be set with respect to the feed screw even with the stage installed and stage position adjustment can be performed with more precision.

In configuring the stage mechanism of the invention, it is preferable that the pressing force adjusting portion further includes a rotary jig connection portion by which a rotary jig for rotating the screw member is detachable (the rotary jig connection portion being referred to as a second rotary jig connection portion in some cases).

With such a configuration, it is possible to further improve the operability of the position adjustment without using any separate special tool.

In configuring the stage mechanism of the invention, it is preferable that the deviation preventing portion includes a protruding portion protruding in a direction perpendicular to a screw axis such that a distance between a surface of the deviation preventing portion on the first end portion side and an end surface of the first end portion is equal to or less than T [mm] as a thickness of the wall of the space portion.

With such a configuration, the first end portion is embedded in the wall of the space portion and further reduction in size can be achieved.

In configuring the stage mechanism of the invention, it is preferable that the first end portion of the feed screw is provided with a rotary jig connection portion by which a rotary jig for rotating the feed screw is detachable (the rotary jig connection portion being referred to as a first rotary jig connection portion in some cases).

With such a configuration, the rotary jig is attached and the position adjustment operation can be facilitated during the stage position adjustment and the rotary jig is removed and use in a narrower installation space is possible after positioning.

In configuring the stage mechanism of the invention, it is preferable that the backlash absorbing portion includes a cylindrical resin member (a cylindrical cushion resin member) having a passage hole for the feed screw.

With such a configuration, the gap formed between the feed screw and the backlash absorbing portion can be filled for further backlash reduction, and thus further precision improvement can be achieved during movable stage position adjustment.

In configuring the stage mechanism of the invention, it is preferable that the backlash absorbing portion has a metal protective cover around the backlash absorbing portion.

With such a configuration, it is possible to prevent deformation of the entire backlash absorbing portion, and thus further precision improvement can be achieved during movable stage position adjustment.

In configuring the stage mechanism of the invention, it is preferable that the cylindrical resin member includes at least one of an amide resin, a urethane resin, and a rubber-based resin.

With such a configuration, the wear that is attributable to feed screw rotation can be reduced, it is possible to more effectively prevent an increase in backlash attributable to repeated use, and thus it is possible to realize highly precise movable stage position adjustment over a longer time period.

MODE(S) FOR CARRYING OUT THE INVENTION

Figure 1A:
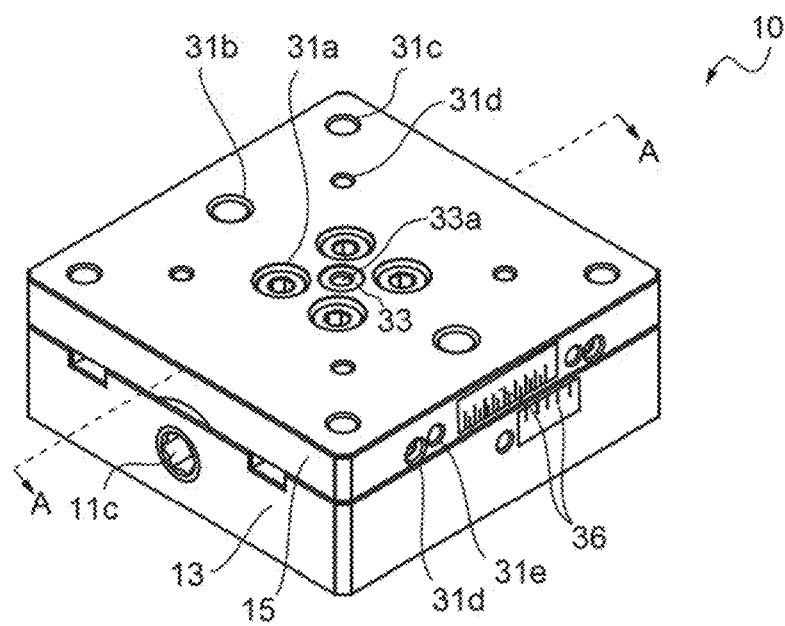
FIG. 1(a) is a perspective view of a stage mechanism 10 of an embodiment.

Hereinafter, embodiments of a stage mechanism of the invention will be described with reference to accompanying drawings. Incidentally, the drawings used for the description are merely schematically illustrated to the extent that the invention can be understood.

In the drawings used for the description, similar components are denoted by the same reference numerals and descriptions thereof may be omitted.

The shapes, dimensions, materials, and so on described in the following description are merely preferred examples within the scope of the invention. Accordingly, the invention is not limited to the following embodiments.

First Embodiment

A first embodiment will be described below. At least a feed screw, a fixed stage, a movable stage, a backlash absorbing portion, a deviation preventing portion, a first rotary jig connection portion, a pressing force adjusting portion, a second rotary jig connection portion, and a guide rail constitute the first embodiment as main configurations. In the configuration of the first embodiment, the movable stage performs a linear motion by the guide rail moving along two grooves provided on the fixed stage.

Figure 1B:
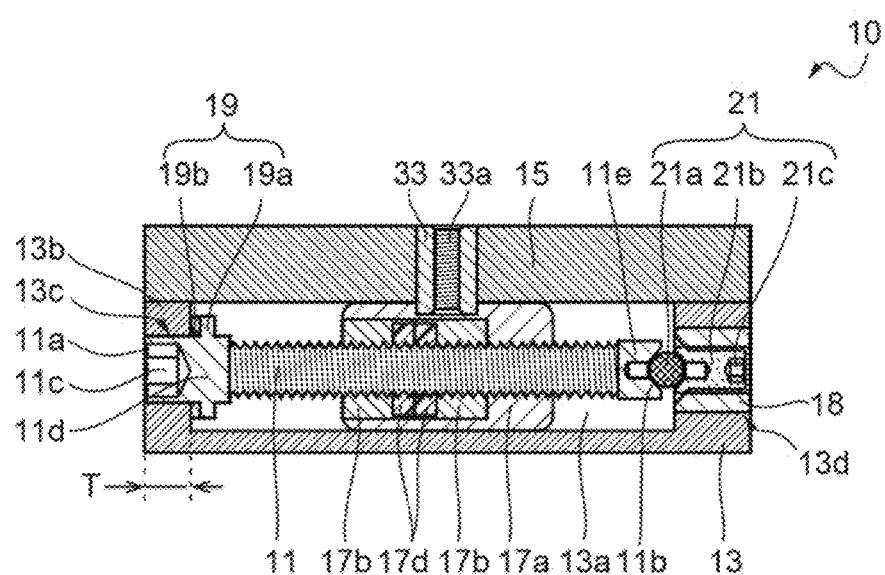
FIG. 1(b) is a cross-sectional view of the stage mechanism 10 obtained in the case of cutting along the A-A line in FIG. 1(a)

FIG. 1(a) is a perspective view illustrating a stage mechanism 10 of the first embodiment as a whole, and FIG. 1(b) is a cross-sectional view of the stage mechanism 10 obtained in the case of cutting along the A-A line in FIG. 1(a).

Figure 2:
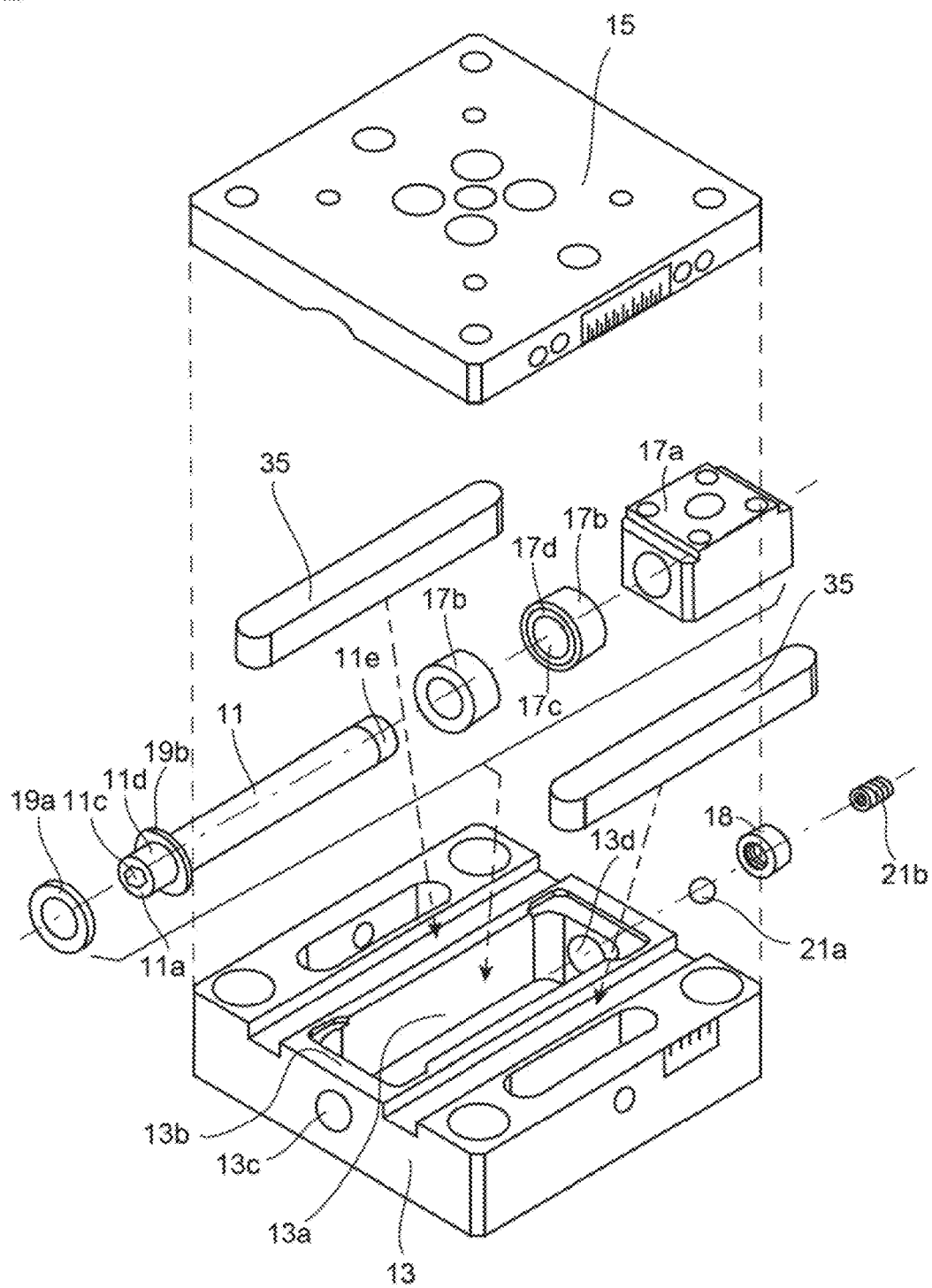
FIG. 2 is an exploded perspective view of the stage mechanism 10 of the embodiment.

FIG. 2 is a perspective view illustrating a state where the stage mechanism 10 is disassembled.

The stage mechanism 10 is provided with a feed screw 11, a fixed stage 13 having a space portion 13a (see FIGS. 1(b) and 2) incorporating the feed screw 11, a movable stage 15, a backlash absorbing portion 17, a deviation preventing portion 19, and a pressing force adjusting portion 21.

Hereinafter, specific configurations of these configurations and the mutual relationships of the configurations will be described as the first embodiment. The configurations indicated by numerals 31a, 31b, 31c, and 31d in the drawings are screws and screw holes for fixing members constituting the stage mechanism 10. The configurations indicated by numerals 31d and 31e are screws and screw holes for restricting the play of guide rails 35 (see FIG. 2) or the like.

The configuration indicated by numeral 33 is a tubular set pin for restricting the play of the movable stage 15 and the backlash absorbing portion 17. The configuration indicated by numeral 33a is a screw hole by which a jig for inserting and removing the set pin 33 is detachable. The configuration indicated by numeral 36 is a movement amount measurement scale for measuring the amount of movement of the movable stage 15 and is a scale having so-called main and vernier scales.

1. Feed Screw

The feed screw 11 has a predetermined length and a thread having a predetermined pitch. The feed screw 11 can be made of a rustproof metal material or the like.

Incidentally, one axial end of the feed screw 11 will be referred to as a first end portion 11d, and the other axial end of the feed screw 11 will be referred to as a second end portion 11e.

2. Fixed Stage (1) Overall Dimensions

The fixed stage 13 is the base of the stage mechanism 10. Usually, the fixed stage 13 has a quadrangular planar shape (including a square planar shape). As for the dimensions of the fixed stage 13, it is preferable that the fixed stage 13 is, for example, a fixed stage having a value within the range of 2 to 10 cm in vertical width, having a value within the range of 2 to 10 cm in horizontal width, and within the range of 1 to 10 mm in thickness.

The fixed stage 13 is provided with a long spot facing portion or the like as the space portion 13a incorporating the feed screw 11, a wall 13b around the space portion 13a, and holes 13c and 13d provided at places facing both end surfaces of the feed screw 11 in the wall 13b (see FIGS. 1(b) and 2).

This is because such overall dimensions allow other components to be disposed without difficulty with sufficient strength maintained for the stage.

(2) Dimension

As for the fixed stage 13, it is preferable that T [mm] as the thickness of the wall of the space portion in the fixed stage is, for example, a value within the range of 1 to 10 mm.

This is because the fixed stage 13 is capable of maintaining sufficient strength as a bearing supporting the first end portion 11d of the feed screw 11 and frictional resistance can be suppressed with respect to the hole 13c in the wall of the space portion when the feed screw rotates.

(3) Type

Usually, the constituent materials of the fixed stage 13 are aluminum (including alumite-treated aluminum), copper, brass, iron, nickel, magnesium, tungsten, ceramic, a polymer resin material, and the like. In particular, the alumite-treated aluminum is suitable as a constituent material of the fixed stage 13 because the alumite-treated aluminum is excellent in lightness, corrosion resistance, durability, workability, thermal conductivity, decorativeness, economy, and so on.

3. Movable Stage

The synchronously sliding movable stage (occasionally called as movable stage) 15 performs a predetermined movement in response to the rotational motion of the feed screw 11. In this case, the predetermined movement is a linear motion in a direction along the axis of the feed screw 11 in a plane parallel to the surface of the fixed stage 13.

Accordingly, in this case, a holder 17a is fixed to the movable stage 15. Further, the backlash absorbing portion 17 is fixed in the holder 17a. Further, the feed screw 11 is inserted in the backlash absorbing portion 17. As a result, the rotational motion of the feed screw 11 is converted into the linear motion of the movable stage 15 and the movable stage 15 performs a linear motion on the fixed stage 13.

Incidentally, a cylindrical resin member 17d, which is resinous, functions as a part of the backlash absorbing portion 17 of the feed screw 11 (details will be described later). The movable stage 15 may be similar in size and material to, for example, the fixed stage 13.

4. Backlash Absorbing Portion (1) Application

The backlash absorbing portion 17 is a member for ensuring the mobility of the movable stage 15 to a satisfactory extent and firmly maintaining a fixed state while suppressing the occurrence of backlash by absorbing the stress that is generated in the movable stage 15 or the like.

In other words, with the backlash absorbing portion 17, predetermined slip properties are exhibited during sliding of the movable stage 15 and rolling, twisting, and the like of the movable stage 15 are easily prevented without the sliding of the movable stage 15 being hindered. When the movable stage 15 is fixed, the backlash of the movable stage 15 is reduced through a moderate deformation. After the movable stage 15 is fixed, the stress that is generated in the movable stage 15 or the like can be easily absorbed and the fixed state can be easily and firmly maintained in a similar manner through sufficient solidification.

Accordingly, it is preferable that the backlash absorbing portion 17 of this embodiment is the cylindrical resin member (cylindrical cushion resin member) 17d having a passage hole 17c for passing the feed screw 11 as illustrated in the cross-sectional view of the backlash absorbing portion illustrated in FIG. 3.

In other words, by the backlash absorbing portion 17 being configured as described above, attachment of the backlash absorbing portion 17 to a predetermined place of the feed screw 11 is facilitated, stress absorption by the backlash absorbing portion 17 is facilitated, and the movable stage 15 is further enhanced with ease in terms of mobility and fixability.

(2) Type

Although the constituent material of the cylindrical resin member 17d in the backlash absorbing portion 17 is not particularly limited, it is preferable that the constituent material is at least one of resin materials such as an amide resin (a nylon resin), an urethane resin, an ester resin, a carbonate resin, an acrylic resin, an olefin resin, a rubber-based resin (such as natural rubber, styrene rubber, butadiene rubber, a styrene-butadiene-styrene block copolymer (SBS), a styrene-isoprene-styrene block copolymer (SIS), and a styrene-ethylene-butylene-styrene block copolymer (SEBS)), an imide resin, an amide-imide resin, a phenoxy resin, a polyether sulfone resin, a polyether ether ketone resin, a silicone resin, an epoxy resin, a cyanate resin, a guanamine resin, an urea resin, and a phenolic resin.

This is because the moldability, backlash absorbency, and so on of the backlash absorbing portion 17 can be enhanced by such a thermoplastic resin or a thermosetting resin material and the movable stage 15 can be further enhanced in terms of mobility and fixability.

With at least one of the amide resin (nylon resin), the urethane resin, and the rubber-based resin in particular, the balance between the mobility and the fixability of the movable stage 15 is even better and excellence in durability and so on is achieved. Accordingly, the amide resin (nylon resin), the urethane resin, and the rubber-based resin are suitable resin materials.

(3) Glass Transition Point

Preferably, the glass transition point (in the case of non-crystalline resin) or the melting point (in the case of crystalline resin) of the constituent material (resin material) of the cylindrical resin member in the backlash absorbing portion 17 is usually a value within the range of 30° C. to 250° C.

This is because the glass transition point or the melting point of such a constituent material being a value of below 30° C. may result in a decline in backlash absorbency and a decline in the fixability of the movable stage 15 attributable to insufficient heat resistance and mechanical strength.

When the glass transition point or the melting point of such a constituent material is a value of above 250° C., the types of usable resin materials may be excessively limited or a significant decline in backlash absorbency may arise.

Accordingly, it is more preferable to set the glass transition point or the melting point of the constituent material of the backlash absorbing portion 17 to a value within the range of 50° C. to 200° C. and it is even more preferable to set the glass transition or melting point to a value within the range of 80° C. to 180° C.

Incidentally, the glass transition point of the constituent material of the backlash absorbing portion 17 can be measured as a point of change in specific heat in DSC measurement. In the case of a constituent material having a melting point, measurement as a DSC melting heat peak temperature is possible in accordance with JIS K 7121.

(4) Metal Protective Cover

As illustrated in FIGS. 1(b), 2, 3(a), and 3(b), the backlash absorbing portion 17 preferably has a metal protective cover 17b having a predetermined form around the backlash absorbing portion 17.

Figure 3A:
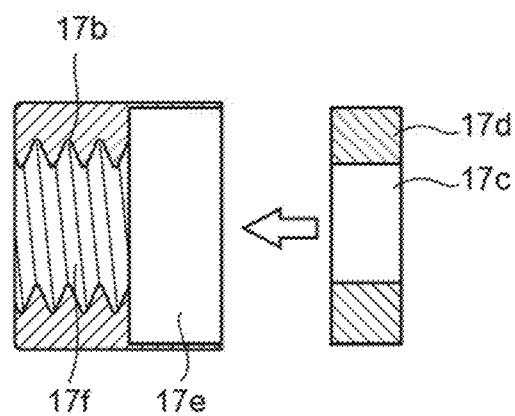
FIG. 3(a) is a diagram for describing an example of mounting of a backlash absorbing portion (including a cylindrical resin member)
Figure 3B:
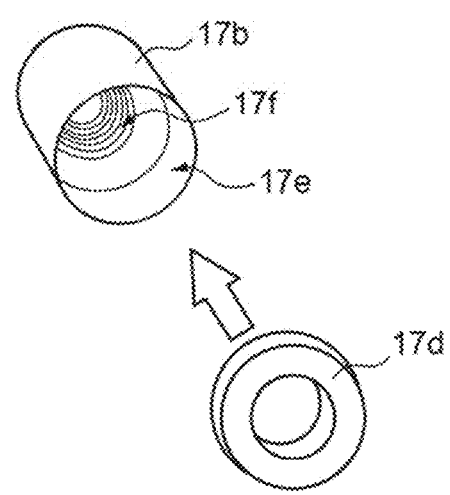
FIG. 3(b) is a diagram for describing a metal protective cover in the backlash absorbing portion.

In other words, it is preferable that the backlash absorbing portion 17 has the metal protective cover 17b integrally including a cap-shaped accommodating portion 17e accommodating the cylindrical resin member 17d as illustrated in FIG. 3 and a screw portion 17f having a screw groove and the backlash absorbing portion 17 is configured by the cylindrical resin member 17d being inserted in the arrow direction in FIGS. 3(a) and 3(b).

This is because the metal protective cover being provided as described above facilitates attachment and fixing of the backlash absorbing portion to a predetermined place of the feed screw, improves the durability of the backlash absorbing portion, and allows the movable stage to achieve excellence in mobility and fixability over a long period of time.

Figure 4A:
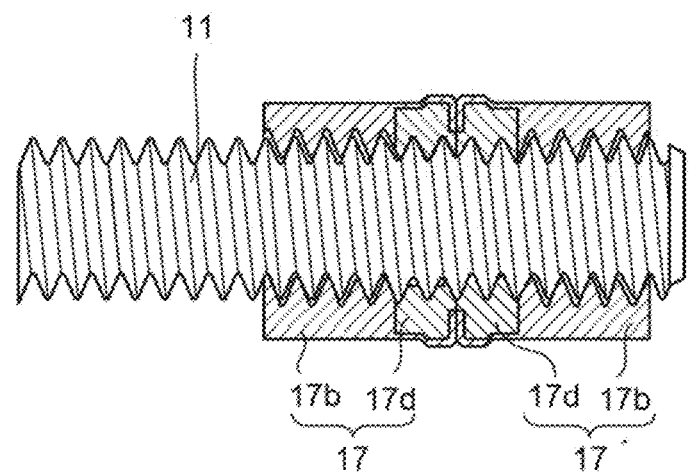
FIG. 4(a) is a diagram for describing the action and effect of the backlash absorbing portion.
Figure 4B:
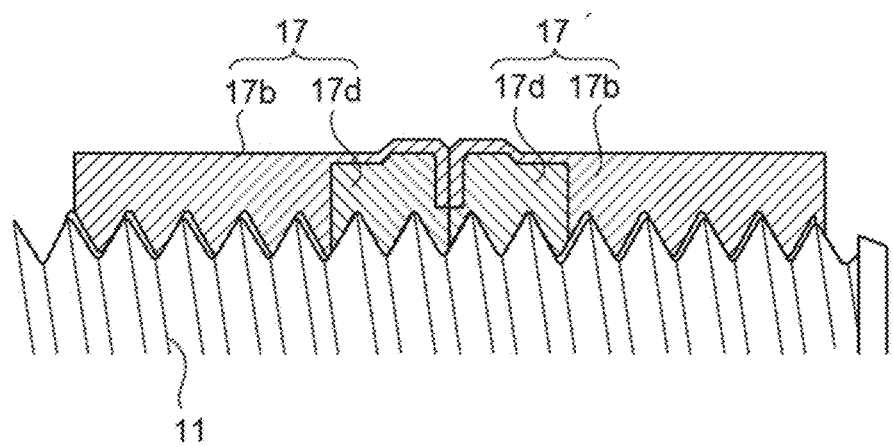
FIG. 4(b) is a partially enlarged view of the drawing illustrated in FIG. 4(a)

As illustrated in FIGS. 4(a) and 4(b), it is also preferable to bend the tip portion of the cap-shaped accommodating portion 17e after inserting the cylindrical resin member 17d into the metal protective cover 17b.

This is because falling of the cylindrical resin member can be prevented and the mobility in the feed screw of the backlash absorbing portion and the stress absorbency in the backlash absorbing portion are further improved as a result of the bending.

Incidentally, although the constituent material of such a metal protective cover is not particularly limited, the material is preferably at least one of aluminum, copper, nickel, iron, and the like in view of lightness and inexpensiveness and in that predetermined deformability and durability are obtainable.

(5) Effect 1

Here, the action and effect of stress absorption by the backlash absorbing portion 17, 17' will be described with reference to FIGS. 4(a) to 4(c).

In other words, FIG. 4(a) is a diagram provided for the description of the action and effect of the backlash absorbing portion 17 and illustrates a state where the feed screw 11 and two backlash absorbing portions 17, 17' (including cylindrical resin members 17d having the metal protective covers 17b) are attached to the space (spot facing portion) 13a formed in the fixed stage 13.

FIG. 4(b) is a partially enlarged view of the two backlash absorbing portions 17, 17' illustrated in FIG. 4(a) and illustrates a state where the respective metal protective covers 17b are disposed so as to face and overlap each other.

Figure 4C:
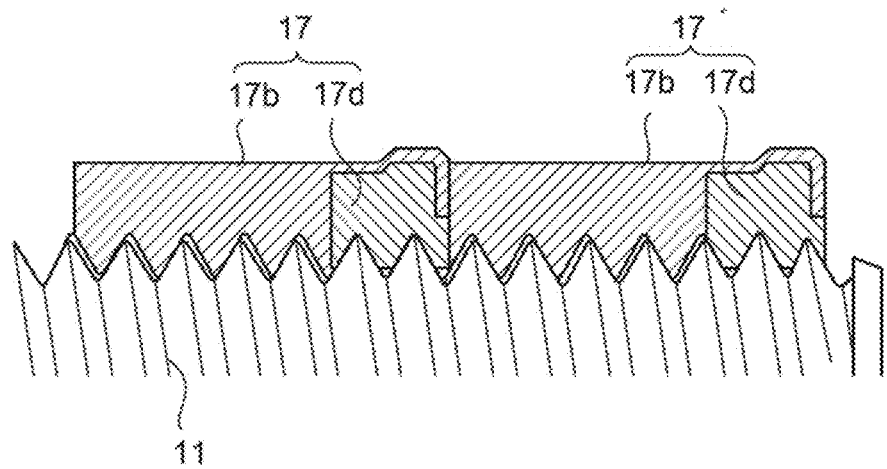
FIG. 4(c) is a partially enlarged view illustrating the configuration of another backlash absorbing portion.

FIG. 4(c) illustrates a state where the two backlash absorbing portions 17, 17' are disposed such that the metal protective covers 17b and the feed screw 11 are in the same direction (each in the rightward direction in the drawing).

Accordingly, in a case where the two backlash absorbing portions 17, 17' are provided as illustrated in FIGS. 4(a) to 4(c) as well as a case where one backlash absorbing portion 17 is provided, during a rotational movement of the feed screw 11 in a predetermined direction, the cylindrical resin member 17d or the like exhibits predetermined slip properties and it is possible to more effectively prevent rolling, twisting, and the like of the movable stage 15 without hindering the movement of the movable stage 15.

Incidentally, although the rotational movement of the feed screw 11 entails a heat generation phenomenon in some cases, the two backlash absorbing portions 17 are capable of efficiently absorbing the heat resulting from such a heat generation phenomenon.

In other words, although the backlash absorbing portion 17 may be partially plasticized by the absorbed heat, predetermined slip properties and so on can be exhibited in an intact manner.

Further, the predetermined metal protective cover 17b is provided around the cylindrical resin member 17d constituting the backlash absorbing portion 17, and thus the cylindrical resin member 17d does not undergo any excessive deformation and the cylindrical resin member 17d does not flow out of a predetermined place.

(6) Effect 2

As illustrated in FIGS. 4(a) to 4(c), in a case where the two backlash absorbing portions 17 are provided, the two backlash absorbing portions 17 can be moderately deformed and the backlash of the movable stage 15 can be further reduced when the rotational movement of the feed screw 11 is stopped and the movable stage 15 is fixed in position.

In other words, although a repulsive stress returning the movable stage 15 is generated as a reaction of the pressing force caused by the rotational movement of the feed screw 11, such a repulsive stress can be efficiently absorbed and the backlash in the movable stage 15 can be further reduced by the backlash absorbing portion 17 being moderately deformed.

Further, the cylindrical resin members 17d included in the two backlash absorbing portions 17 are sufficiently solidified after the movable stage 15 is fixed at a predetermined position.

Accordingly, in the case of the backlash absorbing portions 17 illustrated in FIGS. 4(a) to 4(c), the left backlash absorbing portion 17 is capable of efficiently absorbing the external stress from the left side of the feed screw 11 in the drawings and the right backlash absorbing portion 17' is capable of efficiently absorbing the external stress from the right side of the feed screw 11 in the drawings.

Incidentally, the so-called double nut effect is exhibited even in a case where stress is applied such that one of the two backlash absorbing portions 17, 17' is loosened.

Accordingly, the occurrence of loosening attributable to the cylindrical resin members 17d in the two backlash absorbing portions 17, 17' is effectively prevented. In addition, even in the event of an external stress leading to a movement of the movable stage 15, the stress can be effectively absorbed and the fixed state can be more firmly maintained.

5. Deviation Preventing Portion

Figure 5A:
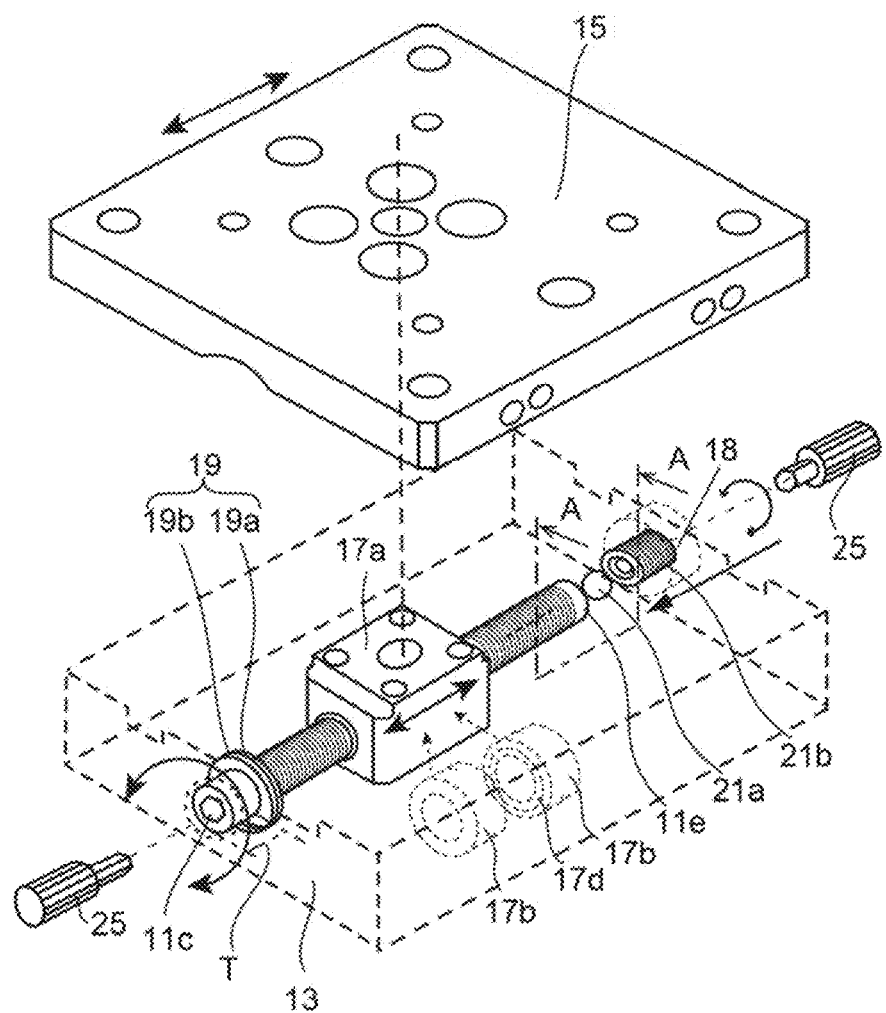
FIG. 5(a) is a partially exploded view of the stage mechanism 10 in which a focus is put on a deviation preventing portion and a pressing force adjusting portion in particular.

Next, the deviation preventing portion 19 will be described mainly with reference to FIGS. 1(b) and 5(a). Incidentally, FIG. 5(a) is a perspective view illustrating the exploded perspective view illustrated in FIG. 2 in a state where a focus is put on the deviation preventing portion 19 and the pressing force adjusting portion 21.

The deviation preventing portion 19 is a member preventing the feed screw 11 from deviating in the direction toward the first end portion 11d.

The deviation preventing portion 19 is provided near the first end portion 11d, which is one end of the feed screw 11. The deviation preventing portion 19 is in contact with the wall 13b of the space portion 13a incorporating the feed screw 11 of the fixed stage 13.

Specifically, the deviation preventing portion 19 of this embodiment preferably includes at least a protruding portion 19a protruding in a direction perpendicular to the axis of the feed screw at a position at which the dimension from an end surface 11a of the first end portion 11d is equal to or less than T [mm].

This is because the configuration taking into consideration the dimension T [mm], the protruding portion, and the like as described above allows contact between the protruding portion and the wall and then an outward deviation of the feed screw from the first end portion side can be restricted and the feed screw can be prevented from deviating.

In addition, this is because it is possible to prevent a member from protruding to the outside of the stage mechanism since the first end portion fits in the hole in the wall and the stage mechanism can be further reduced in size as a result.

It is preferable that the deviation preventing portion 19 includes a slidability improving portion 19b improving the slidability of the protruding portion 19a and the wall 13b of the space portion 13a.

This is because a position adjustment operation is further facilitated as a result of radial torque reduction during feed screw rotation.

Here, the protruding portion 19a is a disk-shaped portion larger in diameter than the feed screw 11 and concentric with the feed screw 11. The hole 13c has an aperture with an appropriate tolerance. The first end portion 11d of the feed screw 11 is inserted into the hole 13c.

Incidentally, in order to further reduce the radial torque of the feed screw, it is preferable to adopt a configuration in which, for example, the inner surface of the hole is treated for high slidability or a highly slidable ring or the like is provided.

6. First Rotary Jig Connection Portion

It is preferable that the end surface 11a on the first end portion 11d side of the feed screw 11 is provided with a first rotary jig connection portion 11c.

Specifically, the first rotary jig connection portion 11c is a structural portion for detachably connecting a jig for rotation for rotating the feed screw 11 to the first end portion 11d of the feed screw from the outside of the stage mechanism 10. The jig for rotation is, for example, a hexagonal wrench (not particularly illustrated), a driver (not particularly illustrated), or a dedicated knob 25. More specifically, the first rotary jig connection portion 11c is preferably a hexagonal female hole or the like.

This is because the configuration provided with the first rotary jig connection portion allows the jig for rotation to be removed during non-adjustment of the stage mechanism and then the stage mechanism can be further reduced in size by no member protruding to the outside of the first end portion side of the stage mechanism.

7. Pressing Force Adjusting Portion

Next, the pressing force adjusting portion 21 will be described mainly with reference to FIGS. 1(b) and 5(a). Incidentally, FIG. 5(a) is a perspective view illustrating the exploded perspective view illustrated in FIG. 2 in a state where a focus is put on the deviation preventing portion 19 and the pressing force adjusting portion 21.

Figure 5B:
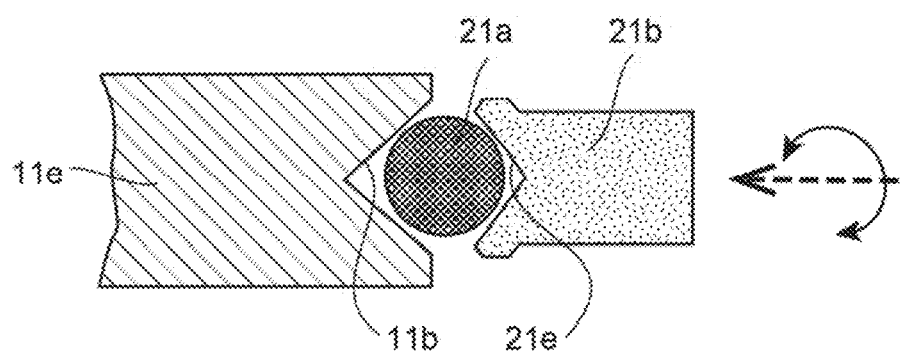
FIGS. 5(b) and 5(c) are partial cross-sectional views obtained in the case of cutting along the A-A line in FIG. 5(a)
Figure 5C:
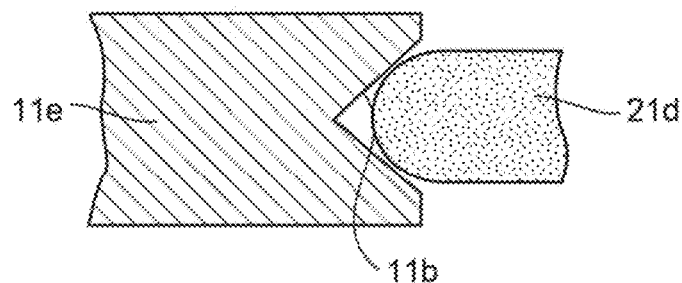

FIG. 5(b) is a cross-sectional view of the pressing force adjusting portion 21 and the second end portion 11e of the feed screw 11 obtained in the case of cutting along the A-A line in FIG. 5(a). FIG. 5(c) is a cross-sectional view illustrated with positional similarity to FIG. 5(b) so that a modification example of the pressing force adjusting portion 21 is described.

The pressing force adjusting portion 21 is a member adjusting the pressing force by which the feed screw 11 is pressed in the direction from the second end portion 11e side to the first end portion 11d. One end of the pressing force adjusting portion 21 is in contact with the second end portion 11e of the feed screw 11. The other end of the pressing force adjusting portion 21 is a member fixed to the wall 13b of the space portion 13a of the fixed stage 13.

It is preferable that the pressing force adjusting portion 21 is a structural member in line contact or point contact with the second end portion 11e of the feed screw 11.

This is because the area of contact between the pressing force adjusting portion and the second end portion of the feed screw is smaller than in the case of surface contact between the pressing force adjusting portion and the second end portion of the feed screw and thus the force rotating the feed screw, that is, the radial torque can be reduced and the operability of the feed screw can be further improved.

Incidentally, in a case where the stability of the pressing force with respect to the feed screw is taken into consideration, the pressing force adjusting portion 21 being a structure in line contact with the feed screw 11 is more preferable than the pressing force adjusting portion 21 being a structure in point contact with the feed screw 11.

This is because the line contact allows an axial deviation to be further prevented even in a case where a force is applied in a direction perpendicular to the axis of the feed screw along with a holder movement.

Examples of the pressing force adjusting portion 21 having such a line contact structure include a structure including a spherical surface (spherical member 21a in the illustrated example) and a spherical surface pressing member 21b, which has a surface in contact with a surface tangent to the spherical surface, as illustrated in FIGS. 1(b) and 5.

More specific examples include the spherical surface pressing member 21b having a mortar-shaped recess structure 21e at a tip as illustrated in FIG. 5(b).

Incidentally, the spherical surface pressing member 21b is a structure that is capable of rotating to the left and right with an axis along the axis of the feed screw 11 as an axis of rotation and is capable of moving forward and backward along the axial direction of the feed screw 11 in accordance with the rotation.

By means of the rotational movement and the linear motion movement entailed by the rotational movement, the pressing force by which the feed screw 11 is pressed from the second end portion 11e side toward the first end portion 11d can be adjusted.

By the deviation preventing portion 19 and the pressing force adjusting portion 21 working together, the axial play of the feed screw 11 can be further prevented.

Incidentally, although the spherical surface pressing member 21b is not limited to the above, a thread screw-shaped member or the like is capable of constituting the spherical surface pressing member 21b with a tip having the mortar-shaped structure described above so as to be V-shaped when a cross section including the axis of the feed screw is viewed.

(1) Modification Example 1

Preferably, a columnar member 21d is used as another example of the pressing force adjusting portion 21 having a structure in line contact with a spherical surface. As illustrated in FIG. 5(c) with cross-sectional similarity to FIG. 5(b), the columnar member 21d has a tip processed on a spherical surface.

This is because simplification or the like can be achieved for the structure of the pressing force adjusting portion as it is not necessary to use a spherical member.

Incidentally, although the second end portion 11e of the feed screw 11 has a tip provided with a spherical surface pressure receiving portion 1ib, which is a mortar-shaped recess structure, and a pressing adjusting portion has a tip processed into a spherical surface in the example illustrated in FIG. 5(c), this configuration may be reversed.

In other words, the tip of the second end portion 11e of the feed screw 11 may be processed into a spherical surface and the tip of the pressing adjusting portion on the second end portion 11e side may have a mortar-shaped recess structure.

Although an example of a structure pressing the second end portion 11e of the feed screw 11 by line contact has been described as the pressing force adjusting portion 21 above, the structure of the pressing force adjusting portion is not limited thereto.

Hereinafter, a modification example of the pressing force adjusting portion will be described with reference to FIG. 7. Incidentally, each drawing in FIG. 7 is a cross-sectional view similar to FIG. 1(b) and is a cross-sectional view focusing on the pressing force adjusting portion in particular.

(2) Modification Example 2

Figure 7A:
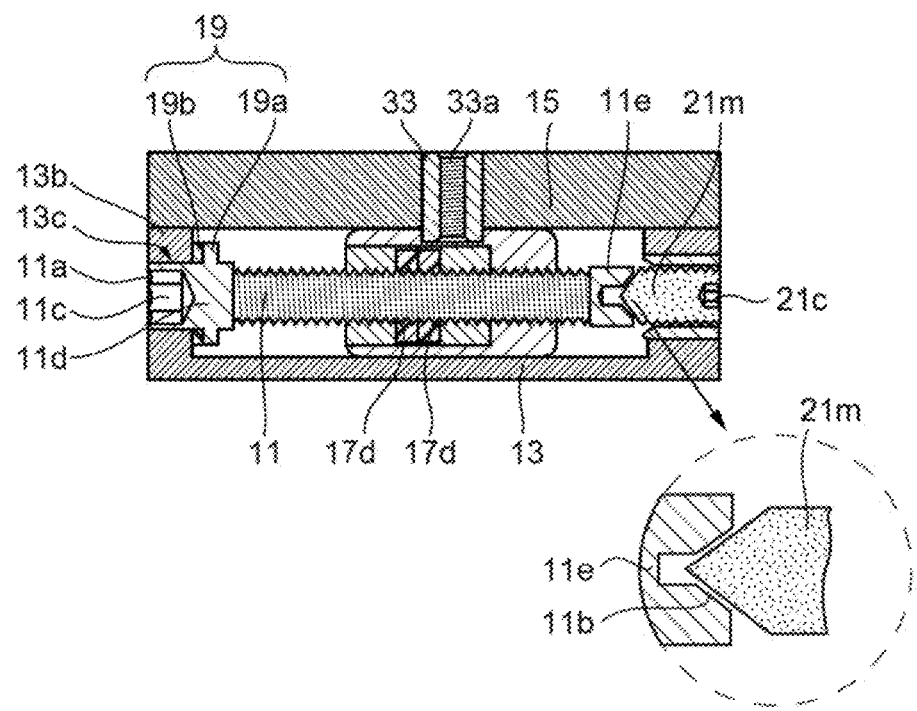
FIGS. 7(a) to 7(c) are diagrams describing another embodiment of the pressing force adjusting portion.
Figure 7B:
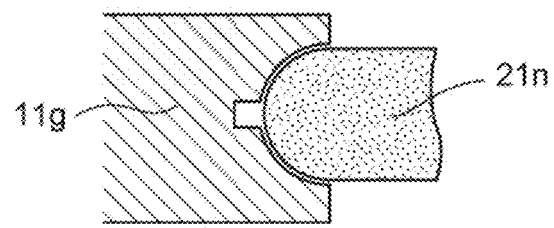

Each of the pressing force adjusting portions 21 in FIGS. 7(a) and 7(b) is an example using a pivot structure. In particular, the pressing force adjusting portion 21 illustrated in FIG. 7(a) is an example in which a columnar member 21m constitutes the pressing force adjusting portion 21 and the columnar member 21m has a structure in which a tip is processed into a triangular pyramid shape so as to correspond to a recess of the second end portion 11e with respect to the second end portion 11e having the recess capable of receiving a triangular pyramid. With such a configuration, processing is easier than in a case where a spherical surface shape is given to a tip, and thus mass production is facilitated. In addition, the structure of the pressing force adjusting portion can be further simplified as it is not necessary to use a spherical member.

(3) Modification Example 3

The pressing force adjusting portion 21 illustrated in FIG. 7(b) is an example in which a columnar member 21n constitutes the pressing force adjusting portion 21 and the columnar member 21n has a structure in which a tip is processed into a spherical surface shape so as to correspond to a spherical surface-shaped recess of a second end portion 11g with respect to the second end portion 11g having the spherical surface-shaped recess. Such a configuration results in an increase in contact region between the second end portion and the columnar member. Accordingly, the wear that is entailed by feed screw rotation can be further reduced even in a case where the pressing force of the pressing adjusting portion is increased.

(4) Modification Example 4

Figure 7C:
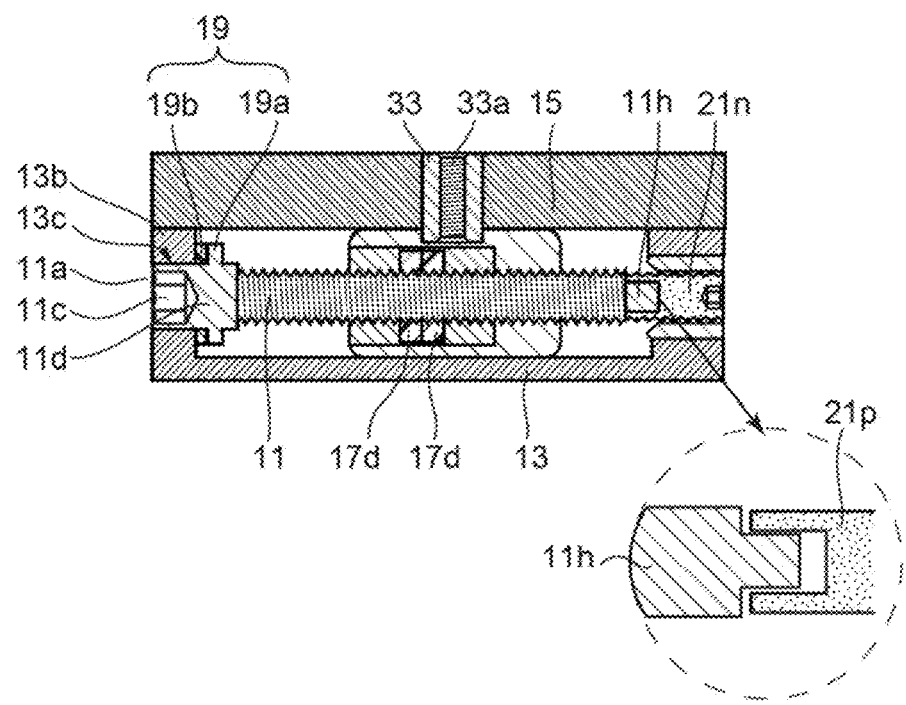

The pressing force adjusting portion 21 illustrated in FIG. 7(c) is an example in which a columnar member 21p constitutes the pressing force adjusting portion 21 and the columnar member 21p has a recess at a tip so as to correspond to a predetermined projecting shape with respect to a second end portion 11h having a tip processed into the predetermined projecting shape. With such a configuration, it is possible to further prevent an axial deviation even in a case where a force is applied in a direction perpendicular to the axis of the feed screw.

8. Second Rotary Jig Connection Portion

Incidentally, in implementing the invention, it is preferable to provide a second rotary jig connection portion 21c (see FIG. 1(b)) on the end surface of the pressing force adjusting portion 21 that is on the outer side.

The second rotary jig connection portion 21c is a structural portion for detachably connecting a rotary jig rotating the pressing force adjusting portion to the pressing force adjusting portion 21 from the outside of the stage mechanism 10. The rotary jig is, for example, a hexagonal wrench (not particularly illustrated), a driver (not particularly illustrated), or the dedicated knob 25. Specifically, the second rotary jig connection portion 21c is preferably a hexagonal female hole or the like.

This is because the configuration provided with the second rotary jig connection portion allows the jig for rotation to be removed during non-adjustment of the stage mechanism and then the stage mechanism can be further reduced in size by no member protruding to the outside of the second end portion side of the stage mechanism.

9. Guide Rail

In the stage mechanism 10, the fixed stage 13 is provided with the guide rails so that the sliding direction of the movable stage 15 is restricted. The configuration of the guide rail will be described below.

Figure 6A:
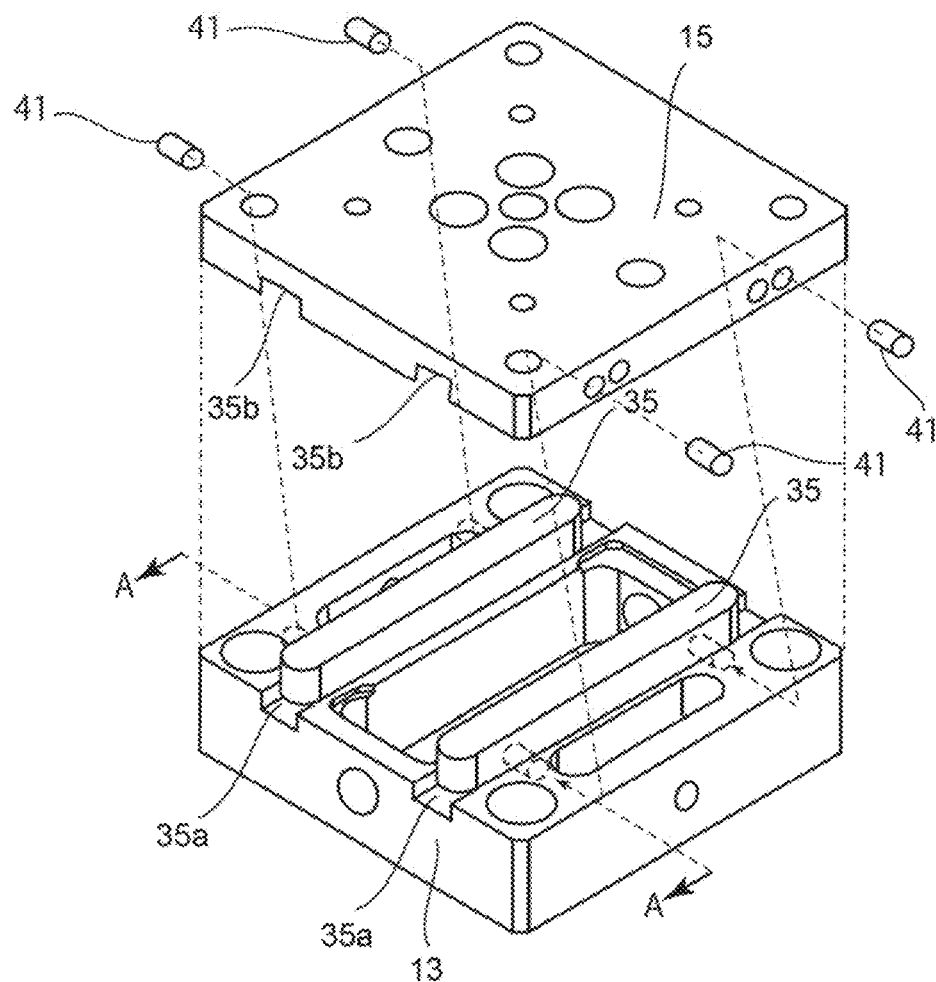
FIG. 6(a) is a partially exploded view of the stage mechanism 10 in which a focus is put on a guide rail structure in particular.
Figure 6B:
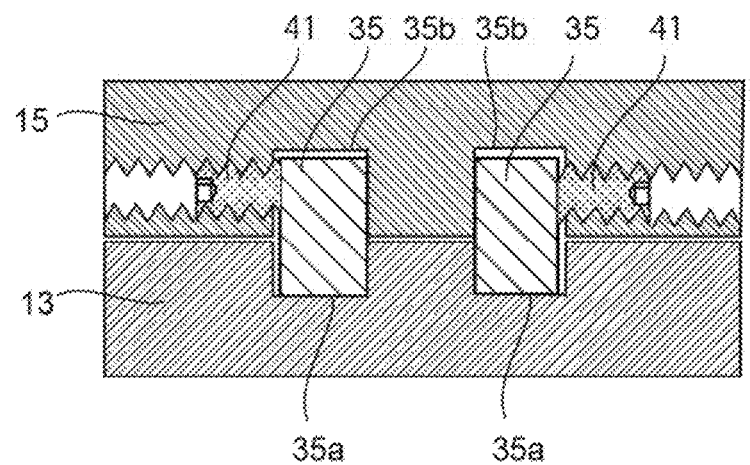
FIG. 6(b) is a cross-sectional view obtained in the case of cutting along the A-A line in FIG. 6(a)

FIG. 6 is an explanatory view of the guide rails. In particular, FIG. 6(a) is a perspective view of a main part illustrating the exploded perspective view illustrated in FIG. 2 in a state where a focus is put on the guide rails 35. FIG. 6(b) is a cross-sectional view obtained in the case of cutting along A-A in FIG. 6(a). Two mutually separated regions of the fixed stage 13 parallel to the feed screw are provided with long grooves 35a for accommodating the guide rails 35.

Two mutually separated regions of the movable stage 15 corresponding to the grooves 35a provided in the fixed stage 13 are provided with long grooves 35b for accommodating the guide rails 35. The guide rails 35 are installed in the grooves 35b on the movable stage 15 side and the guide rails 35 press one side surface of the movable stage 15 with fixing screws 41.

The fixing screw 41 is screwed into a screw hole for the fixing screw 41 provided in the side surface of the movable stage 15, reaches a side surface of the guide rail 35, and presses the guide rail 35. When the movable stage 15 moves, the direction of movement of the movable stage 15 can be further restricted by the guide rail 35 and the groove 35a on the fixed stage 13 side.

Although two guide rails and a groove for restricting a guide rail movement are used as guide structures in the example described above, the guide structure is not limited to the example.

Second Embodiment

A second embodiment will be described below. At least a feed screw, a fixed stage, a movable stage, a backlash absorbing portion, a deviation preventing portion, a first rotary jig connection portion, a pressing force adjusting portion, and a second rotary jig connection portion constitute the second embodiment as main configurations. In the configuration of the second embodiment, the movable stage performs a linear motion by a movable stage gate-type saddle portion moving across a projection of the fixed stage corresponding to the gate-type saddle portion.

Hereinafter, another example of the guide structure will be described as the second embodiment with reference to FIG. 8. Incidentally, the perspective and cross-sectional views in FIG. 8 are illustrated similarly to FIG. 6.

Figure 8A:
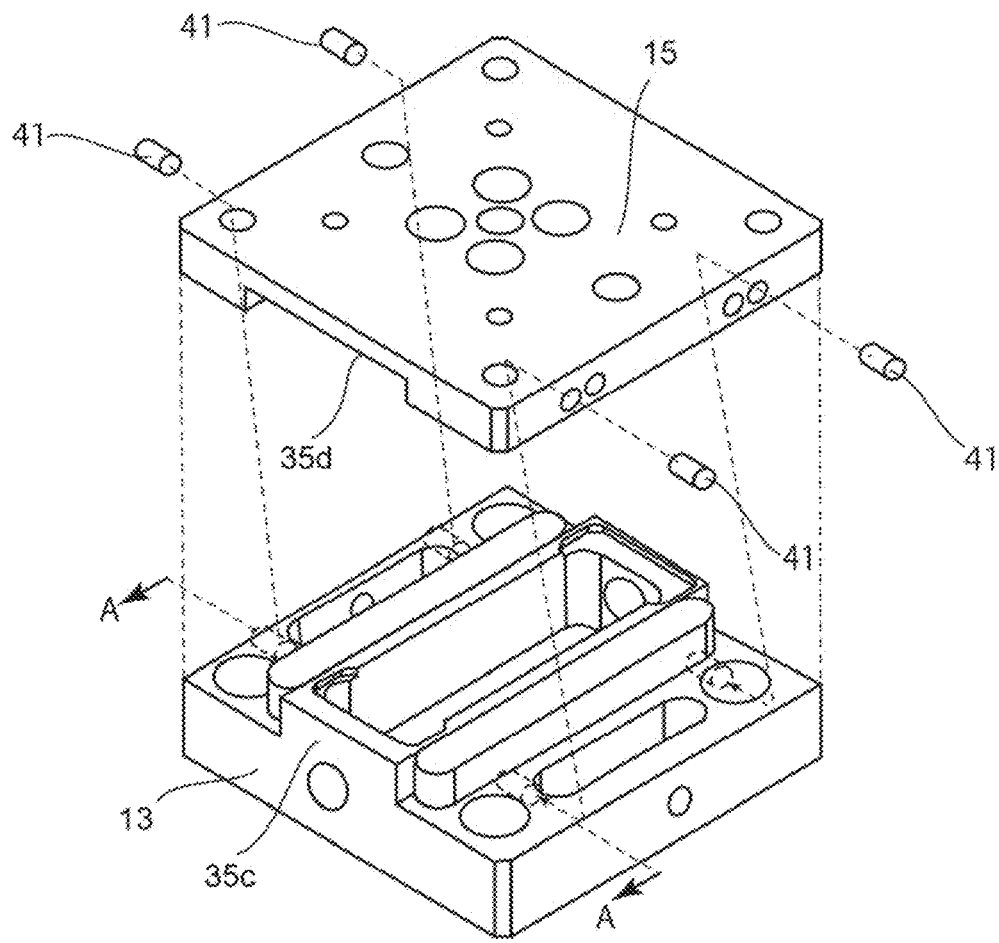
FIG. 8(a) is a perspective view illustrating another embodiment of the guide rail structure.
Figure 8B:
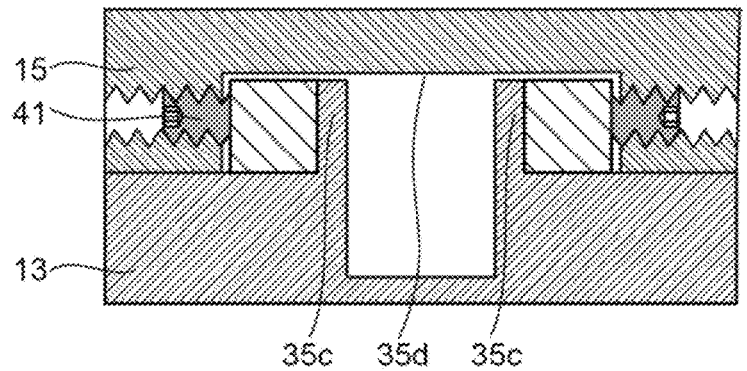
FIG. 8(b) is a cross-sectional view obtained in the case of cutting along the A-A line in FIG. 8(a)

Incidentally, in the guide structure illustrated in FIGS. 8(a) and 8(b), a projecting guide 35c is provided in a predetermined region of the fixed stage 13, a guide rail is provided such that the projecting guide 35c is sandwiched, and a gate-type saddle portion 35d is provided in the region of the movable stage 15 that corresponds to the projecting guide 35c.

1. Feed Screw

Although not illustrated in FIG. 8, the feed screw is similar to the feed screw of the first embodiment and has a predetermined length and a thread having a predetermined pitch. The feed screw can be made of a rustproof metal material or the like.

2. Fixed Stage

The fixed stage 13 has a configuration in which the groove for the guide rail of the fixed stage of the first embodiment is eliminated and the projecting guide 35c is provided. The fixed stage 13 is the base of the stage mechanism 10. Usually, the fixed stage 13 has a quadrangular planar shape (including a square planar shape). As for the dimensions of the fixed stage 13, the fixed stage 13 is, for example, a fixed stage having a value within the range of 2 to 10 cm in vertical width, having a value within the range of 2 to 10 cm in horizontal width, and within the range of 1 to 10 mm in thickness.

After the movable stage 15 and the guide rail 35 are mounted, the fixed stage 13 presses the guide rail 35 with the fixing screw 41 screwed from the side surface of the movable stage 15 into the hole for the fixing screw provided in the movable stage 15 and the side surface of the projecting guide 35c is moderately pressed in the form of being sandwiched by the guide rail. Accordingly, the movable stage 15 is restricted by the projecting guide 35c and moves. With such a configuration, it is not necessary to perform the groove processing that causes play in the first embodiment, and thus stage position adjustment can be performed with more precision.

Figure 8C:
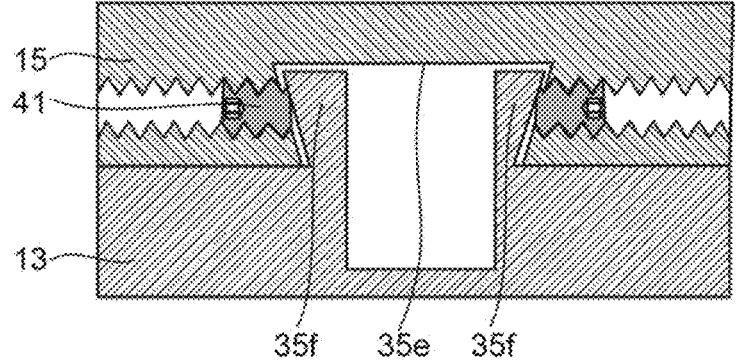
FIG. 8(c) is a cross-sectional view illustrating yet another example of the guide rail structure and similar in position to FIG. 8(b)
Figure 9:
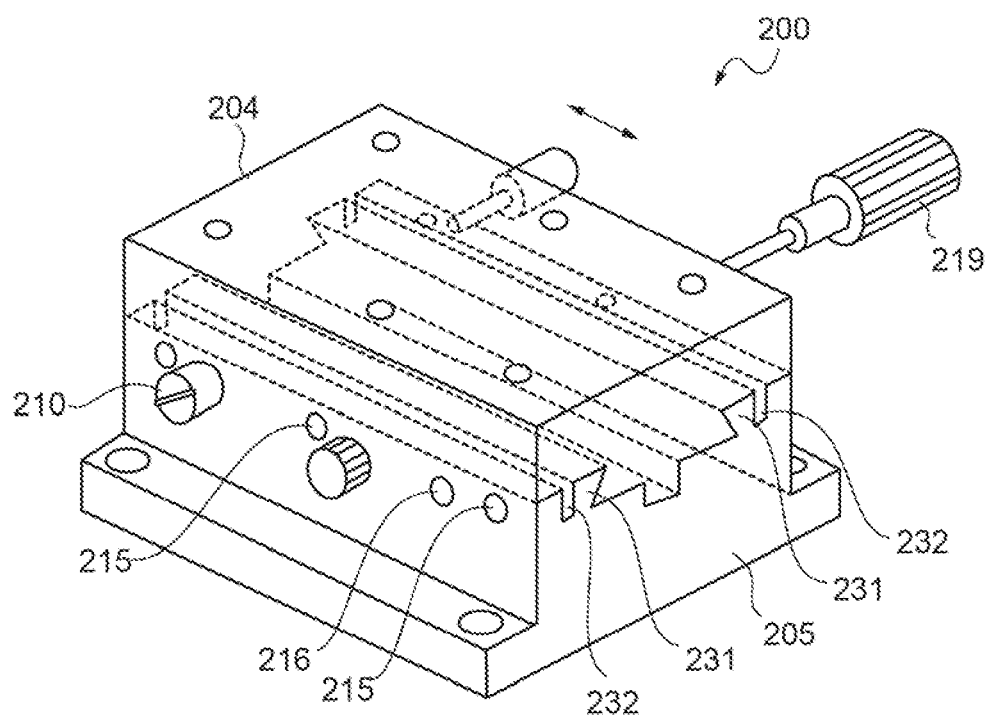
FIG. 9 is a perspective view for describing the manual stage of the related art.
Figure 10:
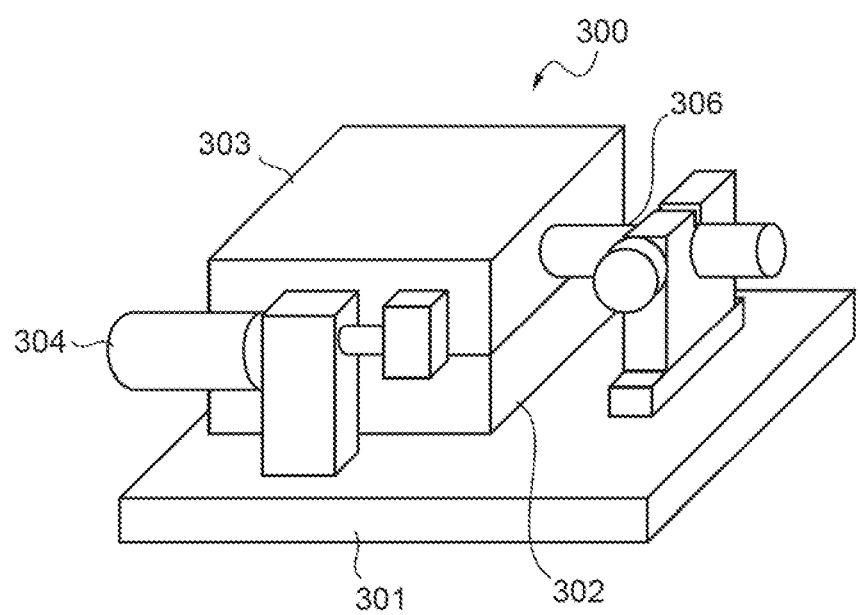
FIG. 10 is a perspective view for describing another stage fixing device of the related art.
Figure 11A:
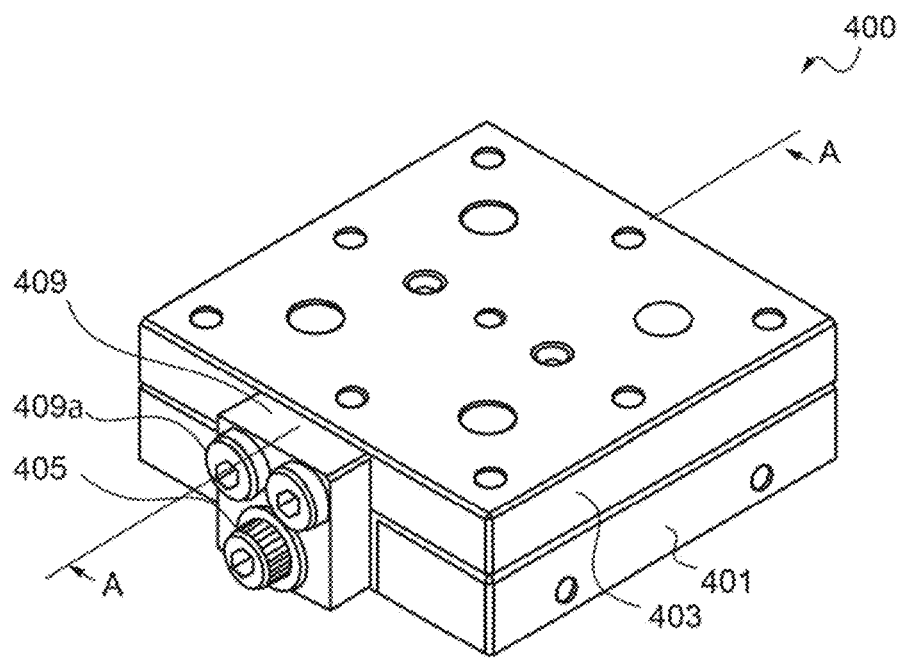
FIG. 11(a) is a perspective view for describing yet another stage fixing device of the related art.
Figure 11B:
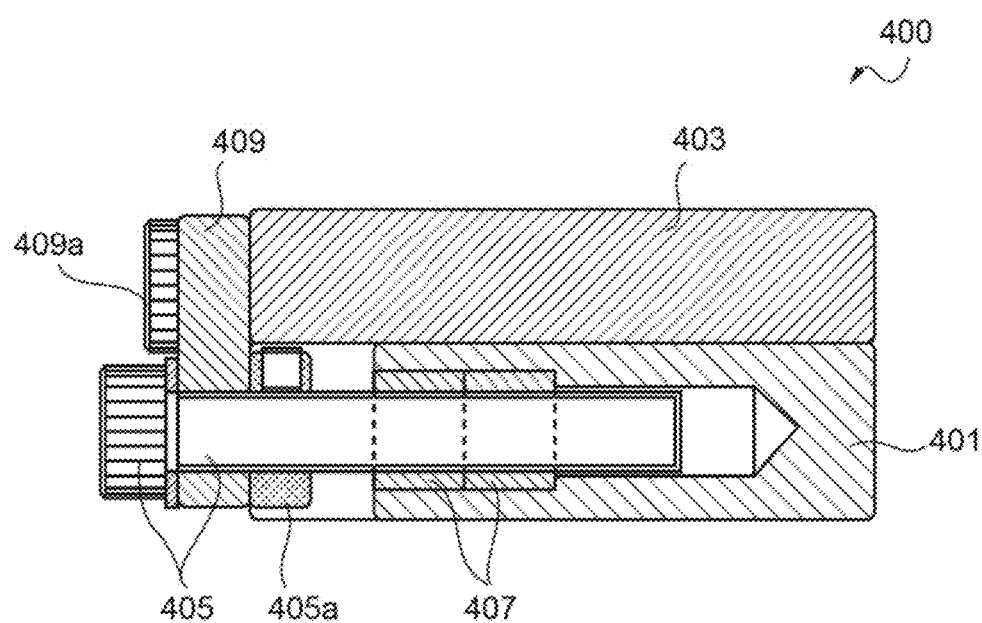
FIG. 11(b) is a cross-sectional view obtained in the case of cutting along the A-A line in FIG. 11(a).

FIG. 8(c) is an example in which a dovetail groove 35e and a guide 35f having a reverse tapered projection structure corresponding to the dovetail groove 35e as substitutes for the guide rail in FIGS. 8(a) and 8(b) constitute a guide structure. With such a configuration, a deviation can be suppressed by the reverse tapered projection even in a case where a force acts in a direction in which the fixed stage and the movable stage move away from each other, and thus stage position adjustment can be performed with more precision.

3. Movable Stage

The sliding movable stage 15 has a configuration in which the groove for the guide rail of the movable stage of the first embodiment is eliminated and the gate-type saddle portion 35d is provided. The movable stage 15 performs a predetermined movement in response to the rotational motion of a feed screw (not particularly illustrated). In this case, the predetermined movement is a linear motion in a direction along the axis of the feed screw (not particularly illustrated) in a plane parallel to the surface of the fixed stage 13. With such a configuration, it is not necessary to perform the groove processing that causes play in the first embodiment, and thus stage position adjustment can be performed with more precision.

Further, no guide rail is required since the guide structure has a dovetail groove structure. Accordingly, the number of parts can be smaller than in the first embodiment and stage position adjustment can be performed with even more precision.

4. Backlash Absorbing Portion

Although not illustrated in FIG. 8, the backlash absorbing portion is similar to the backlash absorbing portion of the first embodiment. The backlash absorbing portion is a member for ensuring the mobility of the movable stage 15 to a satisfactory extent and firmly maintaining a fixed state while suppressing the occurrence of backlash by absorbing the stress that is generated in the movable stage 15 or the like. With such a configuration, predetermined slip properties are exhibited during sliding of the movable stage and rolling, twisting, and the like of the movable stage can be further prevented without the sliding of the movable stage being hindered.

When the movable stage is fixed, the backlash of the movable stage is reduced through a moderate deformation. After the movable stage is fixed, the stress that is generated in the movable stage or the like can be absorbed and the fixed state can be more firmly maintained in a similar manner through sufficient solidification.

5. Deviation Preventing Portion

Although not illustrated in FIG. 8, the deviation preventing portion is similar to the deviation preventing portion of the first embodiment. The deviation preventing portion is a member preventing the feed screw from deviating in the direction toward the first end portion. With such a configuration, it is possible to prevent a member from protruding to the outside of the stage mechanism since the first end portion fits in the hole in the wall and the stage mechanism can be further reduced in size as a result.

6. First Rotary Jig Connection Portion

Although not illustrated in FIG. 8, the first rotary jig connection portion is similar to the first rotary jig connection portion of the first embodiment. The first rotary jig connection portion is a structural portion for detachably connecting a jig for rotation for rotating the feed screw to the first end portion of the feed screw from the outside of the stage mechanism. The jig for rotation is, for example, a hexagonal wrench, a driver, or a dedicated knob.

The jig for rotation can be removed during non-adjustment of the stage mechanism. Accordingly, the stage mechanism can be further reduced in size by no member protruding to the outside of the first end portion side of the stage mechanism.

7. Pressing Force Adjusting Portion

Although not illustrated in FIG. 8, the pressing force adjusting portion is similar to the pressing force adjusting portion of the first embodiment. The pressing force adjusting portion is a member adjusting the pressing force by which the feed screw is pressed in the direction from the second end portion side to the first end portion. With such a configuration, the axial play of the feed screw can be further prevented by the deviation preventing portion and the pressing force adjusting portion working together.

8. Second Rotary Jig Connection Portion

Although not illustrated in FIG. 8, the second rotary jig connection portion is similar to the second rotary jig connection portion of the first embodiment. The second rotary jig connection portion is a structural portion for detachably connecting a rotary jig rotating the pressing force adjusting portion to the pressing force adjusting portion from the outside of the stage mechanism. The rotary jig is, for example, a hexagonal wrench, a driver, or a dedicated knob. With such a configuration, the jig for rotation can be removed during non-adjustment of the stage mechanism. Accordingly, the stage mechanism can be further reduced in size by no member protruding to the outside of the second end portion side of the stage mechanism.

The invention claimed is:

1. A stage mechanism comprising:
   a feed screw;
   a fixed stage having a space portion incorporating the feed screw;
   a movable stage performing a predetermined movement in response to a rotational motion of the feed screw;
   a backlash absorbing portion preventing backlash of the feed screw;
   a deviation preventing portion provided near a first end portion as one end of the feed screw, in contact with a wall of the space portion, and preventing the feed screw from deviating in a direction toward the first end portion; and
   a pressing force adjusting portion having an end in contact with a second end portion as the other end of the feed screw and adjusting a pressing force by which the feed screw is pressed in a direction from the second end portion side to the first end portion, the other end of the pressing force adjusting portion being fixed to the wall of the space portion, wherein
   the pressing force adjusting portion includes a spherical member and a spherical surface pressing member having a recess at a tip, the recess has a shape in contact with a surface tangent to the spherical member, the second end portion includes a spherical surface pressure receiving portion having a recess at a tip, the recess has a surface in contact with a surface tangent to the spherical member, and the spherical member is sandwiched by the spherical surface pressure receiving portion and the spherical surface pressing member on an axis of the feed screw.

2. The stage mechanism according to claim 1, wherein the pressing force adjusting portion is in line contact or point contact with the second end portion of the feed screw.

3. The stage mechanism according to claim 1, wherein the pressing force adjusting portion includes a columnar member, one of a surface of the pressing force adjusting portion with respect to the second end portion and a surface of the second end portion with respect to the pressing force adjusting portion has a spherical surface shape, and the other has a recess shape having a surface in contact with a surface tangent to the spherical surface shape.

4. The stage mechanism according to claim 1, wherein the pressing force adjusting portion includes a screw member applying pressing to the second end portion of the feed screw.

5. The stage mechanism according to claim 1, wherein the pressing force adjusting portion further includes a rotary jig connection portion by which a rotary jig for rotating the screw member is detachable.

6. The stage mechanism according to claim 1, wherein the deviation preventing portion includes a protruding portion protruding in a direction perpendicular to a screw axis such that a distance between a surface of the deviation preventing portion on the first end portion side and an end surface of the first end portion is equal to or less than T [mm] as a thickness of the wall of the space portion.

7. The stage mechanism according to claim 1, wherein the first end portion of the feed screw is provided with a rotary jig connection portion by which a rotary jig for rotating the feed screw is detachable.

8. The stage mechanism according to claim 1, wherein the backlash absorbing portion includes a cylindrical resin member having a passage hole for the feed screw.

9. The stage mechanism according to claim 1, wherein the backlash absorbing portion has a metal protective cover around the backlash absorbing portion.

10. The stage mechanism according to claim 8, wherein the cylindrical resin member includes at least one of an amide resin, an urethane resin, and a rubber-based resin.

* * * * *